Figure 2:
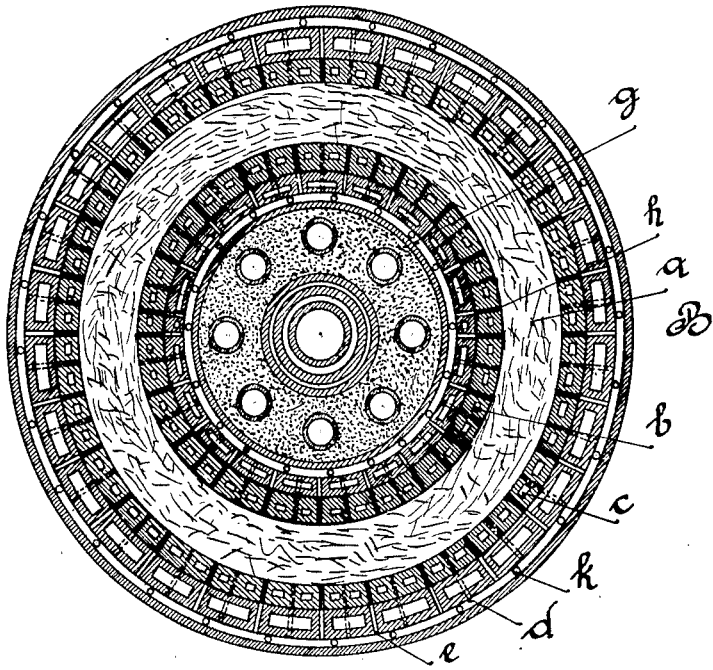
Figure 6:
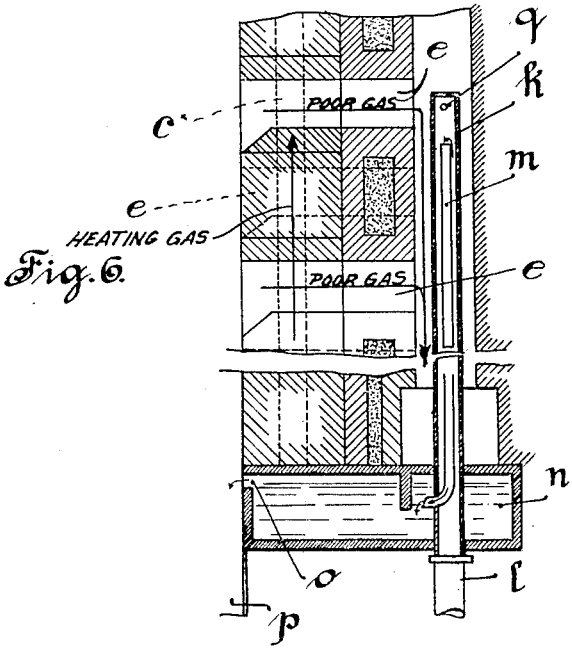

Feb. 19, 1929.  J. LÜTZ  1,702,699
VERTICAL COKING OVEN
Filed Aug. 12, 1921  2 Sheets-Sheet 1
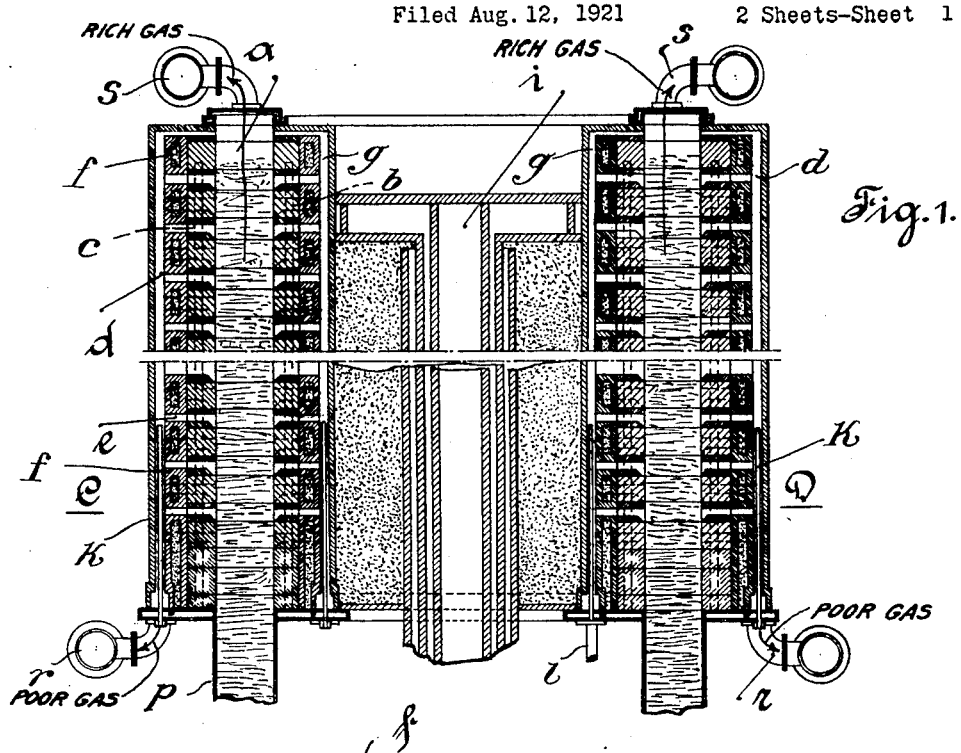
Fig. 1.
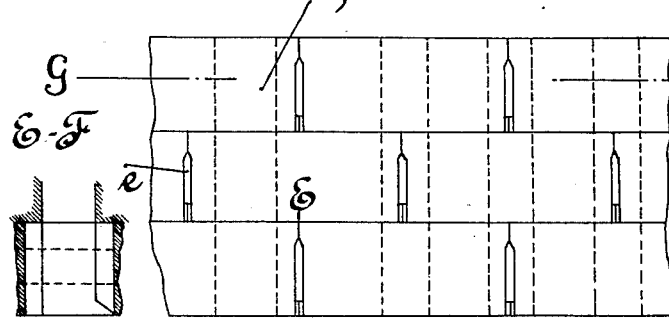
Fig. 3.
Fig. 5.
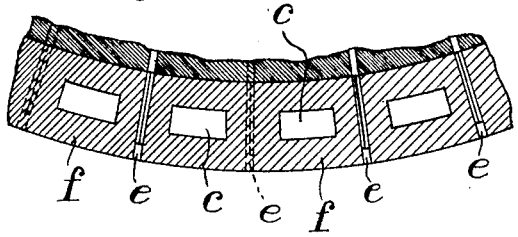
Fig. 4.
Inventor
Johann Lütz Feb. 19, 1929. J. LÜTZ 1,702,699
VERTICAL COKING OVEN
Filed Aug. 12, 1921 2 Sheets-Sheet 2

Inventor
Johann Lütz

Patented Feb. 19, 1929.

1,702,699

UNITED STATES PATENT OFFICE.

JOHANN LÜTZ, OF ESSEN-BREDENEY, GERMANY.

VERTICAL COKING OVEN.

Application filed August 12, 1921, Serial No. 491,819, and in Germany June 21, 1916.

My invention relates to vertical coking ovens and more particularly to ovens for continuous operation. It is an object of my invention to provide an oven of the kind described in which the rich and the poor gases from the coking process are obtained separately.

In the generation of gas, for instance lighting gas, in vertical retorts, as performed heretofore, only high grade coal could be used or, if such coal was not available, it was necessary to lead off separately the gases which were generated during the various stages of the coking process. Now high grade coal is expensive, and on the other hand the expedient of leading off separately the gases resulting in the various coking stages is not only complicated but also entails considerable loss of time as it involves repeatedly reversing the operation of the retort for each charge. Moreover, where high grade coal is used and therefore all the gas obtained is of such high quality as to enable it to be used for lighting purposes, such gas would be too expensive for heating the retort, and it is therefore necessary to provide for heating such retort by means of generator gas or the like.

These drawbacks are overcome in my improved oven by providing a gas collector for the less valuable products and by leading these products away at the bottom of such collector while the valuable products are led off directly from said oven by a separate pipe line provided at the top of the oven. The gas which is led away at the lower portion of the collector is comparatively lean and is preferably utilized for heating the retort, while the gas escaping at the top of the retort is rich and may be used for lighting or other purposes. This gas can be constantly withdrawn. The separation of the rich gases which are removed at the top, and the lean gases which are removed at the bottom, is effected by suction. As the lean gases form at the bottom and the rich gases form at the top, it is possible to so effect this that only the lean gases are removed at the bottom and only the rich gases are removed at the top. It is obvious that by exerting suction at the top and at the bottom it is possible to remove separately the lean gases which form at the bottom and the rich gases which form at the top. Thus without being compelled to reverse the retort it is possible to obtain an uninterrupted supply of high-class illuminating gas at the same time a quantity of lean gas which suffices to heat the retort and which had heretofore to be produced in special generators, is produced in the retort itself. A certain quantity of water-gas may, furthermore, be added to the heating gas, by continuously introducing water into the lower part of the retort which quenches the finished coke contained therein whereby steam is generated which in its turn is decomposed by the higher red hot layers of coke.

For separating the rich and lean gases, generated in the retort, a gas collecting chamber is preferably disposed outside the retort and insulated from it as completely as possible, into which the gas can pass through numerous channels or passages.

In order to effect a quick passage of the gases from the retort into the collecting chamber and to prevent their decomposition, the retort according to the invention is completely surrounded by an annular collecting chamber and at each upright joint of the bricks of the wall interstices are provided which form small gas passages. As far as it appears necessary, the gas in the lower portion of the collecting chamber is cooled by arranging pipes through which water flows. The water used for this purpose and which becomes gradually heated may be utilized for quenching the coke in the lower part of the furnace chamber and for the generation of the water-gas.

In the drawings affixed to this specification and forming part thereof, a vertical coking oven, embodying my invention is illustrated by way of example. In the drawings Fig. 1 is a vertical section on the line A—B in Fig. 2, Fig. 2 is a horizontal section on the line C—D of Fig. 1, Figs. 3 to 6 are detailed illustrations on a larger scale, Fig. 3 being a part elevation of the retort wall, Figs. 4 and 5 being sections on the lines G—H and E—F in Fig. 3, respectively, and Fig. 6 being a part section on the line A—B in Fig. 2.

Referring to the drawings, $a$ is the retort which is here shown annular. On the inner as well as on the outer wall of this chamber flues $b$ and $c$ respectively are provided. Heating gases are supplied to, and abducted from said flues by any suitable means (not shown). The coal is charged into the oven from the top, as usual. The charge gradually sinks down in the oven and the coke is withdrawn at the base of the apparatus (not shown). According to the invention the apparatus is provided with an annular, concentric collecting chamber $d$, into which the gases from the chamber $a$ pass through the numerous narrow channels $e$. These channels or interstices $e$ are disposed in the vertical joints between the bricks $f$ forming the outer wall of the oven and are formed by recesses in the abutting side faces of the bricks. As each fire-brick $f$ contains the openings for two heating flues and the bricks are staggered, the channels $e$ at different levels are also staggered with respect to those above and below them. The tight insulation of the heating flues with regard to the oven is not interfered with by the narrow passages for the gases. In a similar manner a gas collecting space $g$ is provided in the interior of the annular retort, which communicates with the retort through channels or passages $h$. Furthermore, the recuperators $i$ are disposed in the interior of the apparatus in a well known manner.

For cooling the gases and in order to prevent their decomposition, cooling pipes $k$ are provided in the lower portion of the gas collecting chamber, into which pipes the cooling water enters at the bottom through the pipe $l$. Through a pipe $m$ the cooling water from the cooling pipes $k$ is conducted into the water tank $n$, from which it flows into the lower part $p$ of the apparatus through the slot $o$ generating water gas in contact with the coke. In order to prevent explosions, the cooling pipes $k$ are provided at their upper end with small openings $q$. The cooling water is preferably conducted to the cooling installation from a raised tank, the level of which is lower than the openings $q$ of the cooling installation.

From the gas collecting chambers $d$ and $g$ which communicate at the top and bottom, the lean gas for heating the apparatus is drawn off at the bottom through the pipe $r$ and the rich illuminating gas through the pipe $s$ at the top. At the upper end the gas main and the collecting chambers are preferably in communication with the oven itself.

I claim:

1. A vertical coking oven for continuous operation comprising a coking retort the walls of said retort containing heating flues, a gas collector separate from said flues surrounding said retort and connected with it by passages contained in the walls of said retort, a gas discharge pipe connected with said collector at the top, and a gas discharge pipe connected with it at the bottom.

2. A vertical coking oven for continuous operation comprising an annular coking retort, the walls of said retort defining heating flues, a gas collector separate from said flues surrounding said retort, a gas collector arranged in its inner annular space, said collectors being connected with said retort by passages contained in the walls of said retort, a gas discharge pipe connected with said collectors at the top, and a gas discharge pipe connected with said collectors at the bottom.

In testimony whereof I affix my signature.

JOHANN LÜTZ.